(12) United States Patent
Joffe

(10) Patent No.: US 7,155,718 B1
(45) Date of Patent: Dec. 26, 2006

(54) METHOD AND APPARATUS TO SUSPEND AND RESUME ON NEXT INSTRUCTION FOR A MICROCONTROLLER

(75) Inventor: Alexander Joffe, Palo Alto, CA (US)

(73) Assignee: Applied Micro Circuits Corp., San Diego, CA (US)

( * ) Notice: Subject to any disclaimer, the term of this patent is extended or adjusted under 35 U.S.C. 154(b) by 545 days.

(21) Appl. No.: 10/117,394

(22) Filed: Apr. 4, 2002

(51) Int. Cl.
*G06F 7/00* (2006.01)
(52) U.S. Cl. ............. 718/102; 718/100; 718/107; 712/32; 712/216; 712/220; 712/245
(58) Field of Classification Search ............. 718/100, 718/104, 107, 102; 712/216, 32, 220, 245
See application file for complete search history.

(56) References Cited

U.S. PATENT DOCUMENTS

| | | | | |
|---|---|---|---|---|
| 4,520,441 A | * | 5/1985 | Bandoh et al. ............. | 711/203 |
| 5,579,498 A | * | 11/1996 | Ooi ............................ | 712/245 |
| 6,125,236 A | * | 9/2000 | Nagaraj et al. ............. | 710/260 |
| 6,128,657 A | * | 10/2000 | Okanoya et al. ............ | 709/224 |
| 6,906,813 B1 | * | 6/2005 | Tuchitoi et al. ............ | 358/1.14 |
| 2002/0002669 A1 | * | 1/2002 | Yoshioka et al. .......... | 712/244 |
| 2002/0066003 A1 | * | 5/2002 | Nevill et al. ................ | 712/209 |

\* cited by examiner

*Primary Examiner*—William Thomson
*Assistant Examiner*—Qing-Yuan Wu
(74) *Attorney, Agent, or Firm*—Michael Shenker; MacPherson Kwok Chen & Heid LLP

(57) ABSTRACT

In a computer system including at least one microcontroller, by suspending tasks after execution of particular instructions, such as a load-register-from-external-memory instruction, or when a resource is not ready, unnecessary attempts to execute subsequent instruction can be avoided. If a processor register has not yet been loaded and the next instruction attempts to use that register, the task will suspend. A task can also be suspended by incorporating a computer instruction that suspends the task after execution. A task can also be suspended by utilizing resources that provide one or more suspend indications. Such suspend indications can include a "suspend-and-resume-on-current-instruction" indication that suspends the current task and leaves the program counter (PC) value pointing to the current instruction or can include a "suspend-and-resume-on-next-instruction" indication that suspends the current task after completion of the current instruction and advances the program counter (PC) value to point to the next instruction. When the task becomes active again, the task begins execution at the instruction pointed to by the PC.

20 Claims, 15 Drawing Sheets

| Inst. no. | Clk: | 0 | 1 | 2 | 3 | 4 | 5 | 6 | 7 | 8 | 9 | 10 |
|---|---|---|---|---|---|---|---|---|---|---|---|---|
| 1 | HT0 | t0 TS | t1 F | t2 D | t3 R(s) | t4 E | t5 WB | t6 WR | | | | |
| 2 | HT1 | | TS | F | D | R(s) | E | WB | WR | | | |
| 3 | HT2 | | | TS | F | D | R(s) | E | WB | WR | | |
| 4 | HT3 | | | | TS | F | D | R(s) | E | WB | WR | |
| 5 | HT0 | | | | | t0 TS | t1 F | t2 D | t3 R(s) | t4 E | t5 WB | t6 WR |

FIGURE 3
(PRIOR ART)

| Task | State |
|------|---------|
| A | READY |
| B | ACTIVE |
| C | SUSPEND |
| D | ACTIVE |
| E | ACTIVE |

METHOD AND APPARATUS TO SUSPEND AND RESUME ON NEXT INSTRUCTION FOR A MICROCONTROLLER

FIELD OF THE INVENTION

The invention relates to computers and processing among computer processors and resources and more particularly to interfacing microcontrollers to hardware resources that are shared or offer a delayed response, therefore, at times unavailable for the microcontroller.

CROSS REFERENCE TO ATTACHED APPENDIX

Appendix A contains the following files in one CD-ROM (of which two identical copies are attached hereto), and is a part of the present disclosure and is incorporated by reference herein in its entirety:

Volume in drive D is 020329—1606
Volume Serial Number is 2AC6-332D
Directory of d:\

| | | |
|---|---|---|
| 03/29/02 | 04:06p | \<DIR\> . |
| 03/29/02 | 04:06p | \<DIR\> .. |
| 03/28/02 | 02:31p | 365,686 MEMCOP.TXT |
| 03/28/02 | 02:33p | 219,262 UCEXEC.TXT |
| | 4 File(s) | 584,948 bytes |
| | | 0 bytes free |

The files of Appendix A form source code of computer programs and related data of an illustrative embodiment of the present invention.

A uCexec.txt file describes the behavioral model of circuitry in a micro controller's execution unit to decode and execute an instruction to suspend and resume on the next instruction.

A MemCoP.txt file describes the behavioral model of circuitry of the memory co-processor, which is also known as a special processing unit (SPU).

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

A microcontroller is a processor on a microchip that, for example, performs arithmetic/logic operations and communicates with other microcontrollers and processors. A microcontroller is a type of microprocessor. A microcontroller creates a software task to perform a set of instructions. The software task is a self-contained set of program instructions that perform a desired set of operations and functions. For example, a task may perform processing on a packet, which is a unit of data. An instruction is a programming command to direct the microcontroller to perform a single operation. Instructions perform operations on data and registers such as MOVE, LOAD, STORE and CLEAR.

To perform processing on a unit of data, the microcontroller may use an external resource. A resource is external if the resource is mapped into the microcontroller's memory map. A resource is direct if the microcontroller has direct access to the resource, i.e., the resource is not mapped into the microcontroller's memory map. A resource is internal if the resource resides within the microcontroller.

Resources may not always be accessible and ready to use by the microcontroller, for example, if the resource is a shared resource and is currently being used by a different task on the microcontroller or by a different microcontroller. Additionally, resources may be delayed in responding and therefore will not be able to respond within one or two instruction cycles of the microcontroller.

A task running on the microcontroller may execute an instruction that issues a resource request. A resource responds with either a "busy" or a "ready" indication.

If the resource response indicates "busy", the task is suspended. Later, when the resource becomes "ready", the task is awakened and retries the request. Therefore, the request was issued twice: the first time when a "busy" was received and a second time after the task was awakened. This means that this instruction used an execution slot in the processor.

If the resource is "ready" or if the resource has no indication, execution continues normally. Often the next instruction executed attempts to use the results requested from the resource. If the results are not yet ready, the task suspends. Again, this means that this instruction used an execution slot in the processor. When the results later arrive, the task awakes and re-executes the second statement a second time.

U.S. Pat. No. 6,330,584 to Joffe et al. (hereinafter the "Joffe et al.") is incorporated by reference herein in its entirety. Joffe et al. describes a multi-tasking pipelined processor, in which "consecutive instructions are executed by different tasks, eliminating the need to purge an instruction execution pipeline of subsequent instructions when a previous instruction cannot be completed. The tasks do not share registers, which store task-specific values, thus eliminating the need to save or load registers when a new task is scheduled for execution. If an instruction accesses an unavailable resource, the instruction becomes suspended, allowing other tasks' instructions to be executed instead until the resource becomes available. Task scheduling is performed by hardware; no operating system is needed. Simple techniques are provided to synchronize shared resource access between different tasks." (See Joffe et al., abstract.)

Joffe et al. further describes the "ready," "active" and "suspend" task states and transitions among the states. (See Joffe et al., FIGS. 7–13B, and column 11, line 21 through column 17, line 61.)

The prior art discloses a method to suspend tasks, however, once the task is awakened from the suspension, the instruction during which the suspension occurred is re-executed a second time. Therefore, a more efficient way is needed to execute an instruction that leads to task suspension. Additionally, a more efficient way is needed to eliminate the re-execution of instructions after a suspended task awakens.

SUMMARY

The present invention provides in some embodiments pipeline processors, multi-tasking processors, and resource access techniques.

According to some embodiments of the present invention, a method is presented of interfacing a microcontroller to a resource including: (1) starting execution of a current instruction requesting the resource; (2) issuing a resource request; (3) receiving either a resource granted indication, a resource suspended-on-current-instruction indication, or a resource suspended-on-next-instruction indication.

Additionally, some embodiments further including: (4a) continuing execution if the resource granted indication was received; (4b) suspending execution of the current instruction if the resource suspended-on-current-instruction indication was received and re-starting the current instruction if a resume indication is received; or (4c) suspending execution of a next instruction following the current instruction if the resource suspended-on-next-instruction indication was received and starting execution starting on the next instruction if the resume indication is received.

The present invention is better understood upon consideration of the detailed description below and the accompanying drawings.

BRIEF DESCRIPTION OF THE DRAWINGS

FIG. 3 illustrates an instruction execution pipeline of a microcontroller in the execution of multiple tasks in the prior art of FIG. 2.

FIG. 11B illustrates another embodiment of signaling among a microcontroller and resources in accordance with some embodiments of the present invention.

In the present disclosure, like objects that appear in more than one figure are provided with like reference numerals.

DETAILED DESCRIPTION

Figure 1:
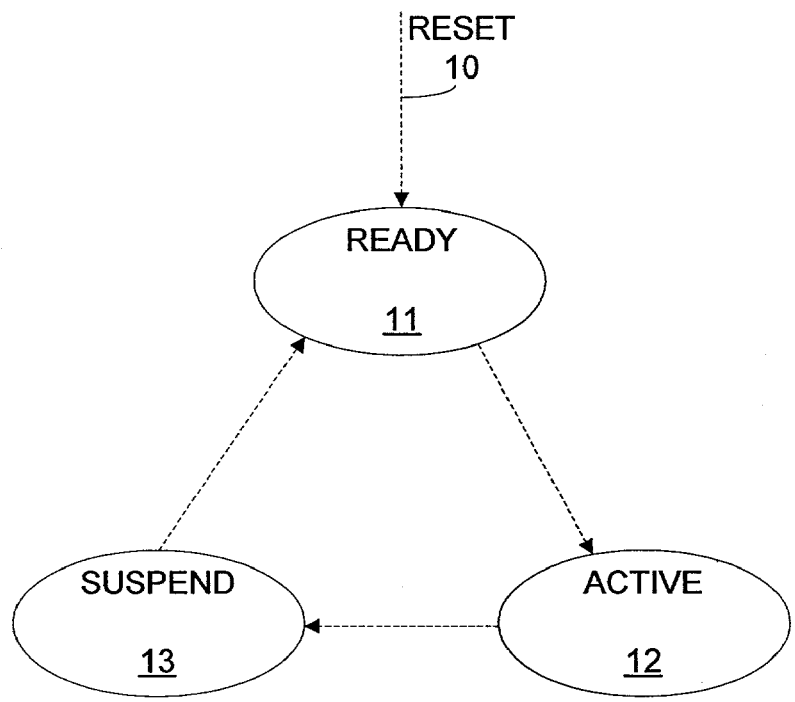
FIG. 1 illustrates a task state machine in the prior art.

This document is related to and incorporates by reference herein in its entirety the following U.S. patent application(s):

U.S. patent application Ser. No. 10/117,779 entitled "Memory Co-Processor for a Multi-Tasking System," Alexander Joffe et al., filed Apr. 4, 2002.

U.S. patent application Ser. No. 10/117,452 entitled "Method And Apparatus For Issuing A Command To Store An Instruction And Load Resultant Data In A Microcontroller," Alexander Joffe et al., filed Apr. 4, 2002.

U.S. patent application Ser. No. 10/117,781 entitled "Logic for Synchronizing Multiple Tasks at Multiple Locations in an Instruction Stream," Alexander Joffe et al., filed Apr. 4, 2002.

U.S. patent application Ser. No. 10/117,780 entitled "Sequencing Semaphore," Alexander Joffe et al., filed Apr. 4, 2002.

U.S. patent application Ser. No. 10/103,436 entitled "Dynamic Allocation of Packets to Tasks," Nathan Elnathan et al., filed on Mar. 20, 2002.

U.S. patent application Ser. No. 10/103,393 entitled "Reordering of Out-of-Order Packets," Nathan Elnathan, filed on Mar. 20, 2002.

U.S. patent application Ser. No. 10/103,415 entitled "Asymmetric Coherency Protection," by Ilan Pardo, filed on Mar. 20, 2002.

In accordance with the present invention, a method and apparatus interface multiple tasks running on a microcontroller to a limited number of resources to increase system flexibility and efficiency. These tasks request resources. When a task requests a resource, that resource might be unavailable to the requesting task because, for example, the resource is servicing a second task or performing internal operations. If the resource is presently unavailable to the task requesting the resource, the resource may receive a suspension indication from the resource. Some resources may send the task a suspend-on-current-instruction indication. Some resources may send the task a suspend-on-next-instruction indication. Other resources may not provide a suspension indication but will be delayed in responding. Once the resource becomes available to service the requesting task, the requesting task receives notice from the resource.

The present method and apparatus allow a task to accept either one of two indications from an unavailable resource: a suspend-on-current-instruction and a suspend-on-next-instruction indication. The method and apparatus also allow for a new computer instruction that indicates whether a task should suspend after requesting the resource. The method and apparatus thereby eliminate the re-execution of instructions after a suspended task awakens.

A microcontroller that includes a multi-tasking pipelined processor executes program instructions from multiple software tasks consecutively, effectively allowing different tasks to run on the microcontroller simultaneously. Each pipeline has an associated execution unit. An execution unit sequentially executes instructions stored in memory that are associated with a selected task as described in Joffe et al. (FIG. 5 and column 9, line 7 to column 10, line 48).

A microcontroller can schedule the execution unit to perform sequential program instructions from different tasks, thus allowing more software tasks to run than pipelines exist in the microcontroller.

Each software task (hereinafter "task") includes a task identification number, a set of program instructions, a state machine and a program counter.

FIG. 1 illustrates a task state machine in the prior art. There is one independent task state machine for each task running on each microcontroller. On task RESET 10, the state machine is initialized to READY 11 state. A task in READY 11 state becomes active when the microcontroller determines that execution of program instructions should begin. Some program instructions require services from one or more resources. If a resource is unavailable, the task may enter the SUSPEND 13 state until the resource becomes available. Once the resource becomes available, the microcontroller changes the state from SUSPEND 13 to READY 11. Conventionally, the microcontroller was set to re-execute the program instruction that was being executed when the task entered the SUSPEND 13 state. (See Joffe et al., FIG. 7 and column 11, line 21 through column 12, line 20, for a further description of the state machines for two tasks with respect to a FIFO resource.)

For each pipeline that the pipelined microcontroller executes in parallel, the microcontroller has an execution unit. Each execution unit performs the steps necessary to execute a program instruction.

Figure 2:
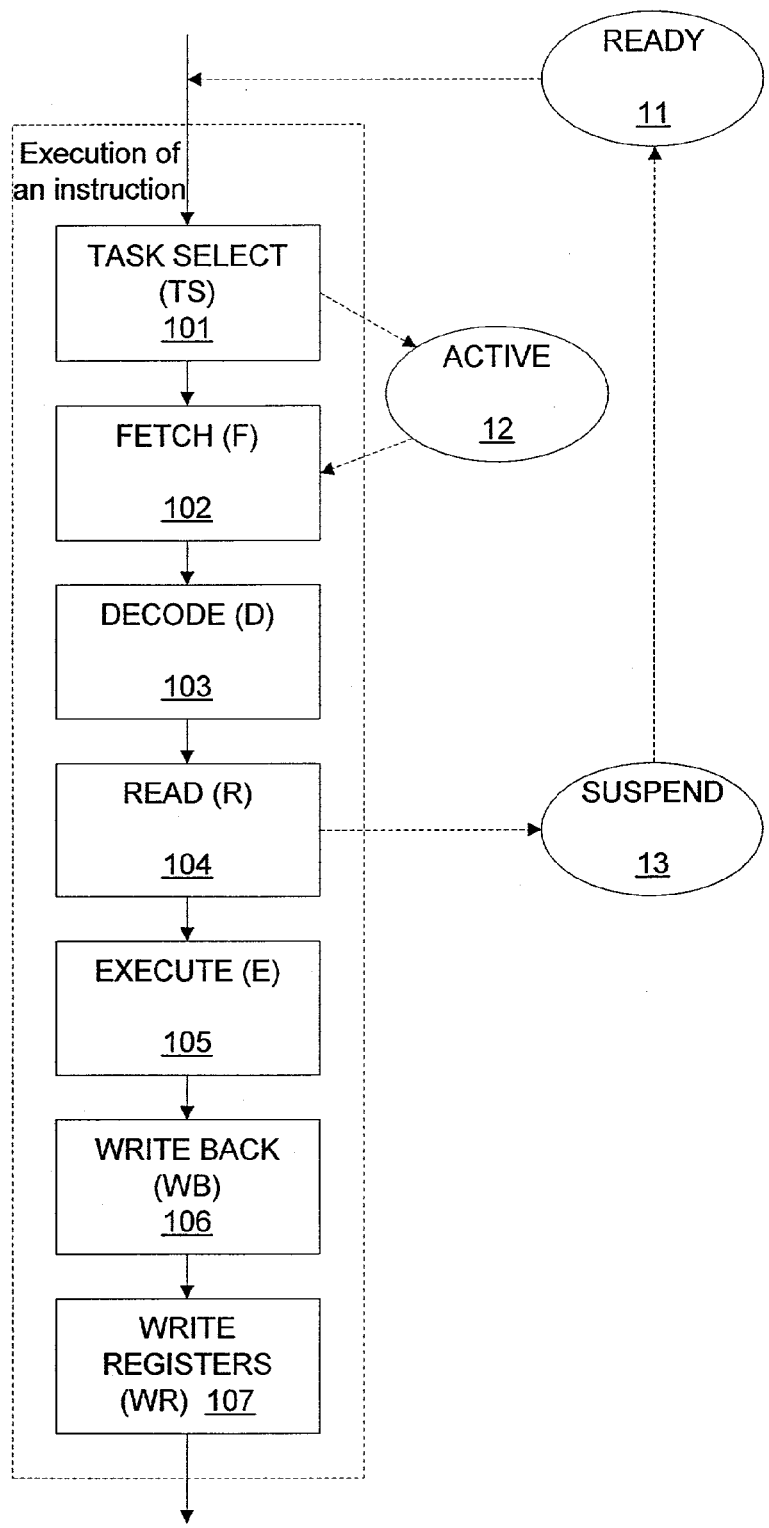
FIG. 2 illustrates an execution unit's flow in executing a single program instruction from a single task in the prior art.

FIG. 2 illustrates an execution unit's flow in executing a single program instruction from a single task in the prior art. The execution unit has seven stages. In the TASK SELECT stage 101, the execution unit selects an active task to begin the execution process. In the TASK SELECT stage 101, the state of the selected task is updated from READY to ACTIVE. In the FETCH stage 102, the execution unit fetches from program memory the program instruction pointed to by the task's program counter (PC). In the DECODE stage 103, the execution unit decodes the fetched program instruction. In the READ stage 104, the execution unit reads values from registers and memory identified during decoding. In the EXECUTE stage 105, the execution unit executes the decoded instruction on the read data. In the WRITE BACK stage 106, the execution unit writes the results of the EXECUTE stage to their destinations (except if the destination is a register). In the WRITE REGISTERS stage 107, the execution unit writes the results of the EXECUTE stage to designated registers.

FIG. 3 illustrates an instruction execution pipeline of a microcontroller in the execution of multiple tasks in the prior art of FIG. 2. A microcontroller executes multiple instructions, each from one or more tasks. The figure illustrates five program instructions (Inst. No. 1–5) executing in a pipeline fashion and is further described in Joffe et al. (column 9, line 45 through column 10, line 62) with modifications as described below. The Joffe et al. patent states in column 10, lines 49–57 that "when an instruction is aborted (at the R stage), the pipeline does not have to be purged from other instructions that have already been started, because these instructions belong to other tasks (moreover, to other hardware tasks). For example if instruction 1 has to be aborted, the only other instructions that have been started on or before the R stage of instruction 1 are instructions 2, 3, and 4. These instructions do not have to be purged because they are executed by other tasks."

Figure 4:
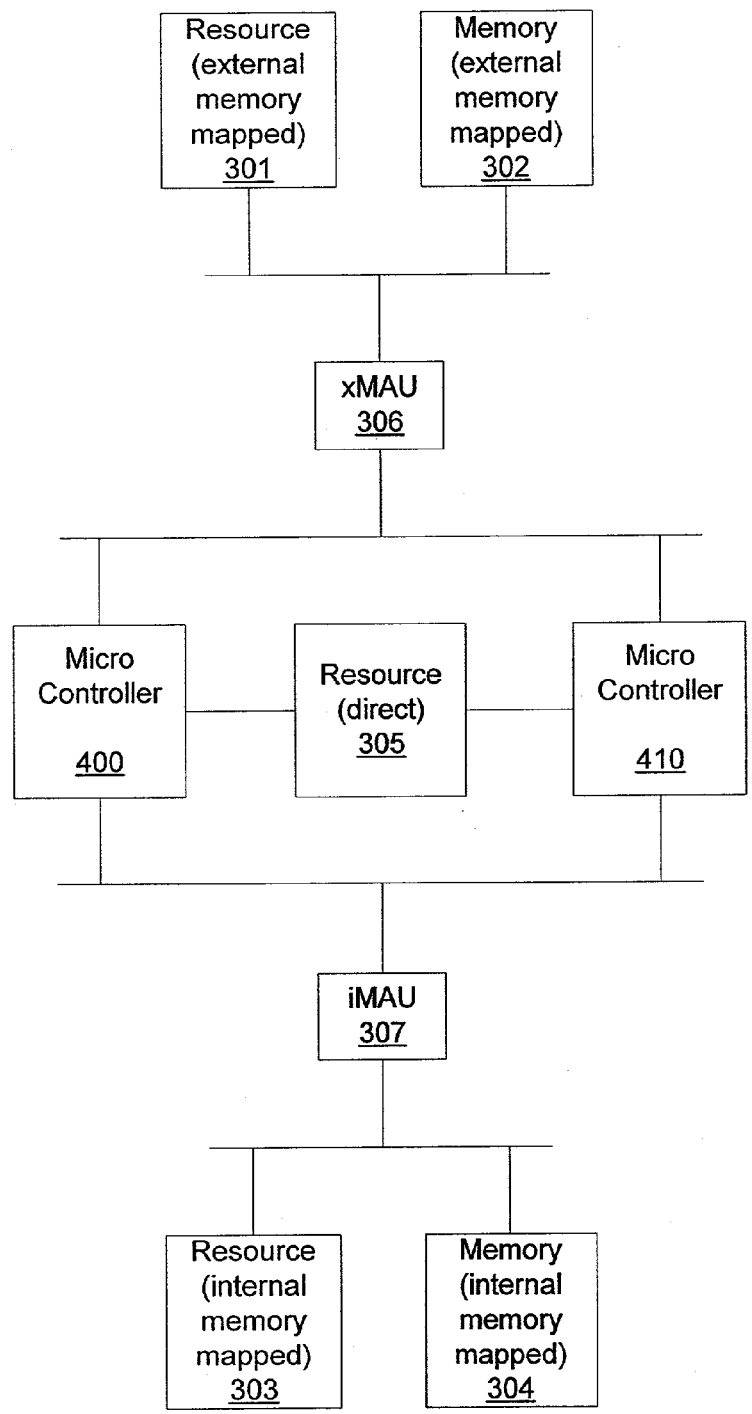
FIG. 4 illustrates a block diagram interconnection among microcontrollers and resources.

FIG. 4 illustrates a block diagram interconnection among microcontrollers and resources. This is a typical application of the present inventive method and apparatus in a multi-processor system. Resources may be directly or indirectly connected to a microcontroller. Direct resource 305 connects directly to microcontroller 400 without the use of a memory addressing unit (MAU). Microcontroller 400 can connect to multiple direct resources. Each direct resource 305 can connect to multiple microcontrollers. Resources can also be positioned internally to microcontroller 400. Such internally positioned resources (not shown) can have interconnection equivalent to interconnections to direct resources. Interconnections between microcontroller 400 and direct resource 305 and between microcontroller 400 and a resource internal to microcontroller 400 can include suspension lines to indicate a "suspend-and-resume-on-next-instruction" indication as described below.

Microcontroller 400 and microcontroller 410 connect indirectly to resources as well. Indirect resources are allocated locations in a microcontroller's memory map. The memory map includes locations in external memory and locations in internal memory. Memory mapped resources connect to microcontrollers via MAUs. External memory mapped resources connect to microcontrollers 400 and 410 via an external memory addressing unit (xMAU) 306. External resources include both resources 301 and memory 302. Internal memory mapped resources connect to microcontrollers 400 and 410 via an internal memory addressing unit (iMAU) 307. Internal resources include both resources 303 and memory 304.

Figure 5:
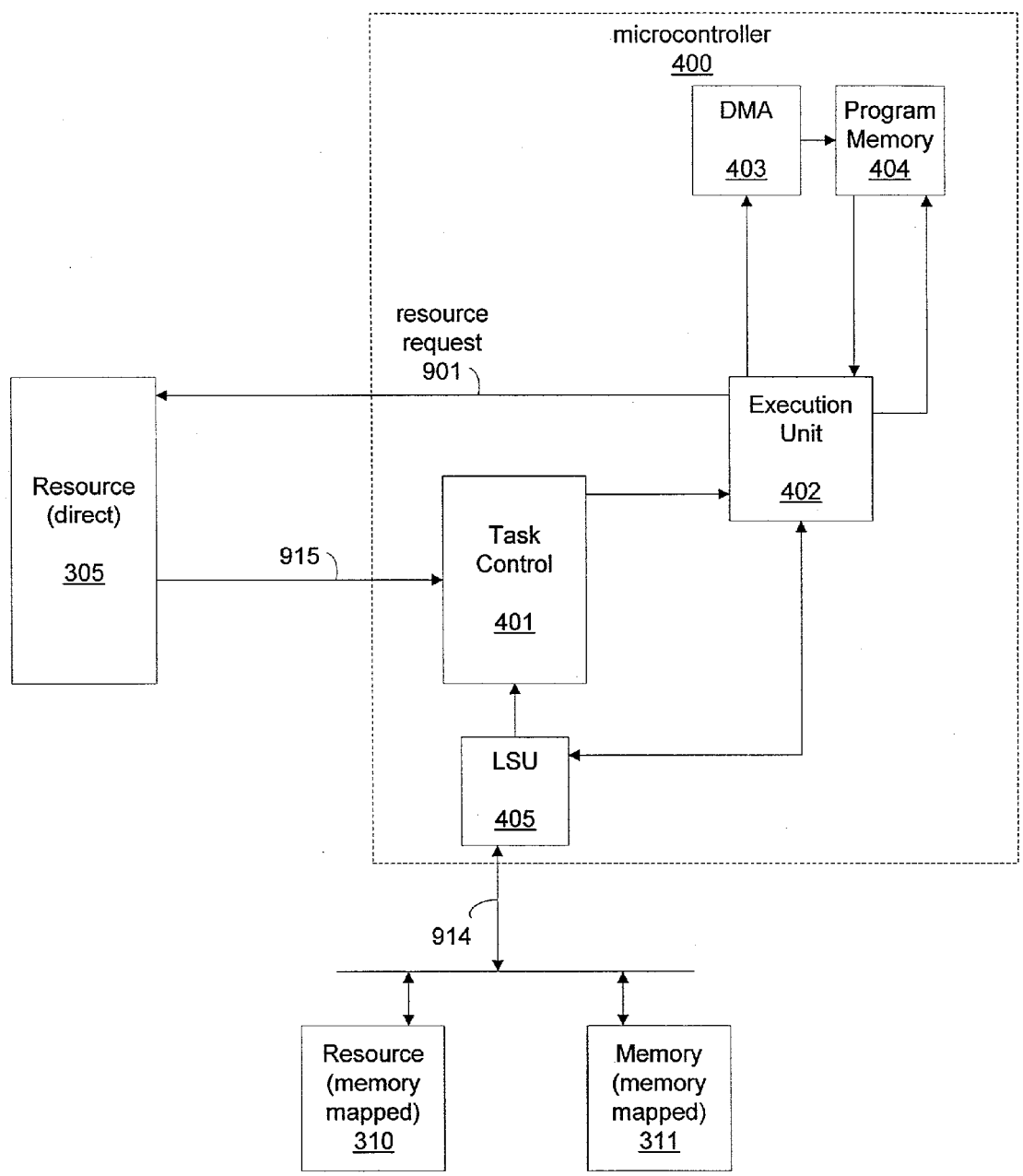
FIG. 5 illustrates a block diagram of a microcontroller including an execution unit in accordance with some embodiments of the present invention.

FIG. 5 illustrates a block diagram of a microcontroller including an execution unit in accordance with some embodiments of the present invention. Microcontroller 400, which includes execution unit 402, is further described in Joffe et al. with modifications as described below. (See Joffe et al., FIG. 5 and column 9, line 7–44.)

Execution unit 402 executes programs stored in program memory 404. Programs are conventionally downloaded from ROM (not shown) during boot. In addition, applets can be loaded and executed dynamically as described in Joffe et al.

Execution unit 404 includes a register file having general purpose registers, a special registers block, and a data memory. The register file includes two 32-bit outputs connected to respective buses sa-bus, sb-bus, which in turn are connected to inputs of an ALU (not shown) of execution unit 402. The 32-bit outputs of the data memory and the special registers block are connected to sa-bus. Separately connected to bus sa-bus are the outputs of special registers "null" and "one" (See Joffe et al., Table A6-1, Addendum 6) that store constant values (these registers are marked "Constant regs" in FIG. 5).

Bus sa-bus also receives the immediate field "imm" of an instruction read from program memory 404. The 64-bit output of ALU is connected 64-bit bus res-bus which is connected to inputs of the register file, the data memory, and the special registers block.

The register file, the data memory and the special registers are as described in Addendum 6 of Joffe et al. As described therein, the registers and the data memory are divided between tasks so that no save/restore operation is needed when tasks are rescheduled. In particular, the special registers include 16 PC (program counter) registers, one for each task.

Load/store unit (LSU) 405 provides an interface between execution unit 402, a search machine (not shown), and memory mapped resources 310 and memory mapped memory 311. LSU 405 queues load requests to load a register of execution unit 402 from a memory mapped device 310 or 311. LSU 405 also queues store requests to save the contents of a register of execution unit 402 to a memory mapped device 310 or 311.

LSU 405 has an input connected to res-bus and also has a 64-bit output rfi connected to an input of register file 312. Interconnect 914 connects LSU 405 of microcontroller 400 to both internal and external memory mapped resources 310 and 311 via MAUs (not shown).

DMA block 403 has an input connected to the bus res-bus to allow execution unit 402 to program DMA 403. DMA 403 can load applets into the program memory.

Interconnect 915 connects task control block 401 of microcontroller 400 to resource 305.

Task control block 401 controls the task execution of execution unit 402. Task control block 401 supplies execution unit 402 with control signals.

Figure 6:
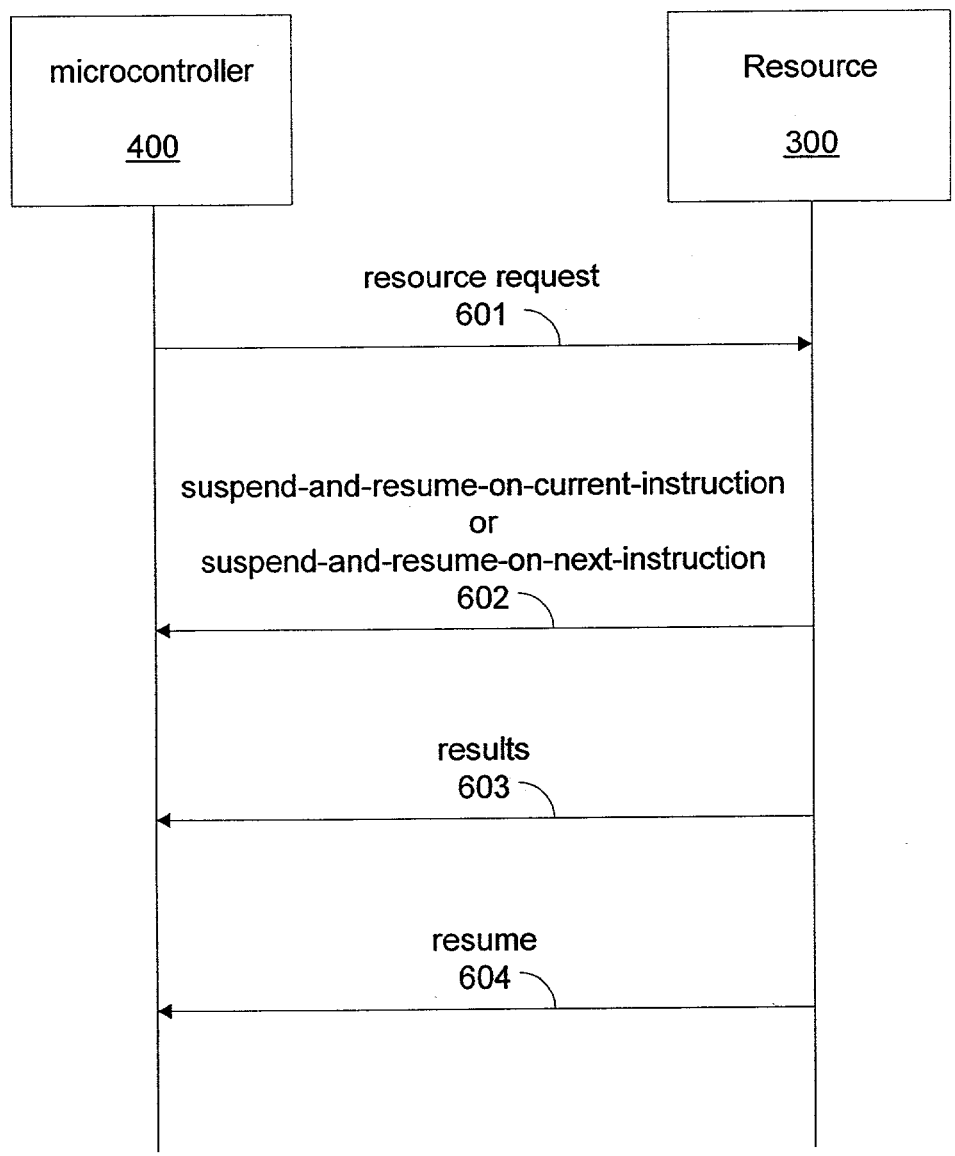
FIG. 6 illustrates messaging between a microcontroller and a resource in a suspension scenario in accordance with some embodiments of the present invention.

FIG. 6 illustrates messaging between a microcontroller and a resource when the resource responds with a suspension indication in accordance with some embodiments of the present invention. When a resource is needed by a task, microcontroller 400 issues a resource request 601 to a resource 300. Resource 300 may be direct resource 305, memory mapped external resource 301, memory mapped external memory 302, memory mapped internal memory resource 303, or memory mapped internal memory 304.

Upon receiving resource request 601, resource 300 may or may not immediately respond. If resource 300 responds within the execution of the instruction, resource 300 will provide the requests results 603 or may indicate to the task that the task should suspend 602. When suspending, resource 300 sends suspend indication 602: either a "suspend-and-resume-on-current-instruction" indication or a "suspend-and-resume-on-next-instruction" indication. After resource 300 determines it can provide the requested resource or honor the request, resource 300 may provide a resume indication 604 along with results 603. In some embodiments, the receipt of the results 603 implies a resume indication 604.

Figure 7A:
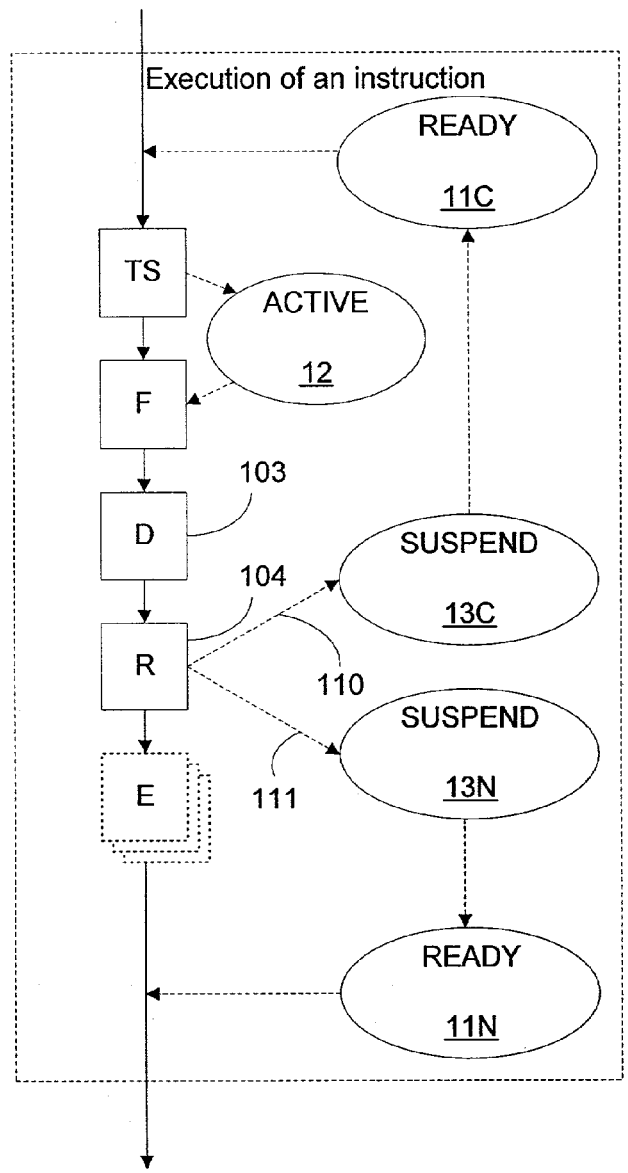
FIG. 7A illustrates an execution unit's flow in executing a single program instruction from a single task including state transitions for a task in accordance with some embodiments of the present invention.

FIG. 7A illustrates an execution unit's flow in executing a single program instruction from a single task including state transitions for a task in accordance with some embodiments of the present invention. After a task has been selected, the task select stage (TS) sets the task state to ACTIVE 12, an instruction is fetched (F) then decoded (D). Decode 103 determines if the instruction directs the task to suspend. Some instructions may include a suspend flag to invoke a suspend after performance of the instruction. The flag may indicate whether the suspension of the task should occur or not occur. If the instruction directs the task to suspend, read (R) stage 104 will set the task state to SUSPEND 13N and set the program counter (PC) (not shown here) to begin execution on the next instruction. Once the resource provides a resume indication 604, the task state will change to READY 11N allowing execution of the next instruction once the task is selected again.

Alternatively, the instruction may not include a suspend flag or the flag is set to a no-suspend state. In such cases, the execution of the read stage 104 may invoke a suspension. If a request from a previous instruction went to resource 300 directing resource 300 to provide result 603 that would be stored in a register of execution unit 402, a flag is set for that register to indicate that the register is not yet ready for use. The flag, called a dirty-bit, is set to a dirty state to indicate the register contains unwanted or unknown data. If the instruction being executed includes a read operation of a register whose dirty bit is set, the task enters a SUSPEND 13C state and the PC remains on the current instruction. At a later time when result 603 arrives at microcontroller 400, the dirty-bit is clear to indicate the associated register's value is ready. The task enters the READY 11C state and execution of the same instruction occurs again. This time, because the dirty-bit is not set, the read operation of the register can proceed without a suspension.

Figure 7B:
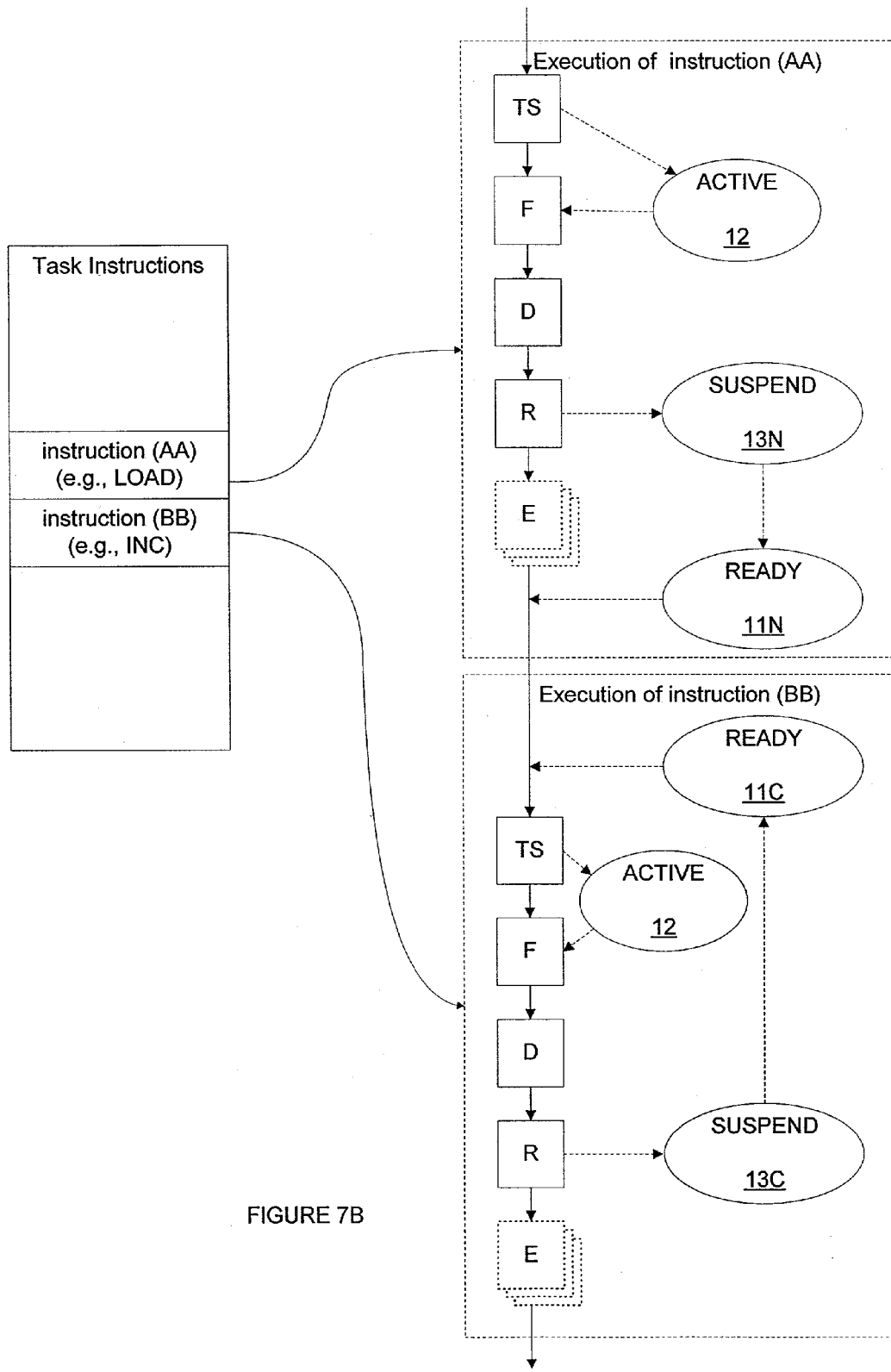
FIG. 7B illustrates an execution unit's flow in executing two program instructions from a single task including state transitions for a task in accordance with some embodiments of the present invention.

FIG. 7B illustrates an execution unit's flow in executing two program instructions from a single task including state transitions for the task in accordance with some embodiments of the present invention. Instruction AA may be, for example, a LOAD instruction that commands execution unit 402 to get data from resource 300 and save that data to a designated register within execution unit 402. The instruction may also include a suspend flag that, if set would indicate that after execution of the instruction the task should be suspended.

Once the task is selected, the task state becomes ACTIVE 12. The instruction is fetched. The instruction is then decoded. During decode, execution unit 402 decodes the value of the suspend flag. The read state issues a resource request command. For a LOAD instruction, the read stage generates a read request type resource request. LSU 405 sets an associated dirty-bit to indicated that the contents of the designated register are not yet available.

After sending the read request to resource 300, execution unit 402 checks the suspend flag. If the suspend flag is set, execution unit 402 advances the PC to point to the next instruction and sets the task to enter a SUSPEND 13N state.

When resource 300 provides result 603 or provides resume indication 604, the results are stored in the designated register, the dirty-bit is cleared, and the task enters the READY 11N state.

When the task is selected again for execution, the task enters the ACTIVE 12 state and execution of instruction BB begins. Assume that instruction BB attempts to use the register designated in a previous instruction. For example, assume the LOAD instruction above is followed by a MOVE instruction. Assume also that both the LOAD instruction and the MOVE instruction both change the same register. If the data is not yet loaded into the designated register, the dirty bit will still be set and any access of that designated register will lead the task to suspend.

If the task was suspended by the previous instruction (e.g., LOAD instruction with a suspend flag set), the task will be suspended before access to the designated register is attempted. The designated register will first be filled and the dirty-bit will be cleared before the dirty bit is checked. Because the dirty bit is not set, the task does not suspend upon execution of the instruction BB.

Without a suspend flag in instruction AA, instruction BB would be executed and the execution would most likely be suspended because the results from instruction AA would most likely not have been sent to and stored in execution unit 402. Because results 603 have been loaded into the destination register, instruction BB is executed without entering the SUSPEND 13C state, thus saving the probable re-execution of instruction BB.

Alternatively, upon execution of an instruction AA which sends a request to a resource, the resource may provide a suspend indication 602. If the suspend indication 602 indicates that the task should suspend and resume on the next instruction, then the PC is advanced and the task enters the SUSPEND 13N state. If the suspend indication 602 indicates that the task should suspend and resume on the current instruction, the PC remains unchanged then the task enters the SUSPEND state.

Figure 7C:
FIG. 7C illustrates memory locations for a load instruction.

FIG. 7C illustrates memory locations for a load instruction. Source data 702 resident or generated by resource 300 is loaded into a register 701 residing on microcontroller 400. The source data may be either a single byte, a group of bytes within a word, an entire word, or a block of words as indicated by a byte mode operand and length operands. The corresponding destination register or registers will be filled with results 603 when results 603 or resume indication 604 arrive. In a block word load scenario, a corresponding block of registers is loaded. For example, if 5 words are requested to be loaded into destination registers beginning with the second to last register, the first two words will be loaded into the last two registers and the next three words will be loaded into the first three registers.

Figure 7D:
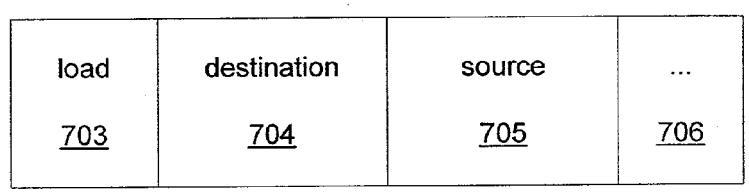
FIG. 7D illustrates a load instruction with operands.

FIG. 7D illustrates a load instruction with operands. The operands include load opcode 703, destination address 704 and source address 705.

The load instruction may optionally include additional information 706, for example, a byte mode operand and data length operand as described above. The load instruction may also include a suspend flag as described above. Additionally, the load instruction may include an indexing flag and/or indexing value to advance destination address pointers and source address pointers if used.

Figure 7E:
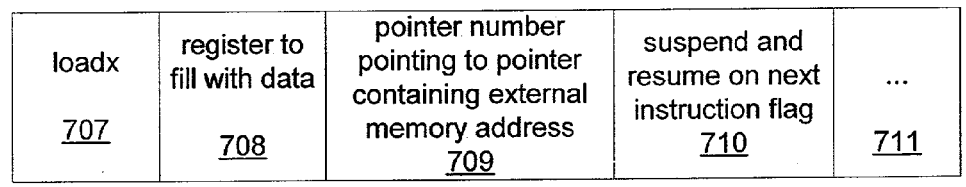
FIG. 7E further illustrates a load instruction with operands.

FIG. 7E further illustrates a load instruction with operands. A load instruction may indicate an internal load or an external load. Operand loadx 707, for example, indicates an external memory load xMAU 306 from resource 301 or 302. Destination 704 may indicate register 708 or indicate a pointer to a register. Source 705 may be identified with a pointer to an address 709, or with a pointer to an address pointer. The load instruction may include a suspend flag 710 indicating the task should suspend after execution of the current instruction and later continue with execution of the next instruction.

Again, the load instruction may optionally include additional information 711 as described in 706 above.

In some embodiments, a LOAD instruction is coded in machine language as follows. The LOAD instruction is encoded to 32-bit machine language. The instruction has multiple operands ("load Immo, opA, mpn, Num, s, u, o, y, ds") as implemented.

Immo (bits 14 . . . 8): Immo is the immediate offset. It is a signed two's complement value.

OpA (bits 24 . . . 18): opA (operand A) is a general purpose (GP) register or a task register.

mpn (bits 17 . . . 16): mpn is a memory pointer number. It is used to point to one of four memory pointer registers.

Num (bits 28 . . . 25): Num+1 is the number of registers to load, starting at opA. The order of loading registers is as follows: GP(0) . . . GP(1) TR(0,1) . . . TR(14,15). For example if opA=TR(14) and Num=3, then the following registers are loaded: TR(14,15) GP(0) GP(1) GP(2).

s (bit 15): s is the task suspend bit: 0 means task execution continues; 1 means task execution suspended until the load results are written to the register(s). This option is used if there is a data dependency after the LOAD instruction.

u (bit 7): u is the memory pointer update bit: 0 means mp[mpn] is left unchanged; 1 means mp[mpn]=mp[mpn]+Immo.

o (bit 6): o is the address offset bit: 0 means Address=mp[mpn]; 1 means Address=mp[mpn]+Immo.

y (bit 30): y is the synchronize to store bit used with external memory only: 0 means the instruction is issued in order with other LOAD instructions; 1 means the instruction is issued in order with other STORE instruction.

ds (bit 29): ds is the destination bit used with external memory only: 0 means the load is a non-SPU access; 1 means the load is a SPU access Bit 31 is not used and is set to zero. Bits 5 . . . 0 are the opcode bits indicating a LOAD instruction.

Figure 8:
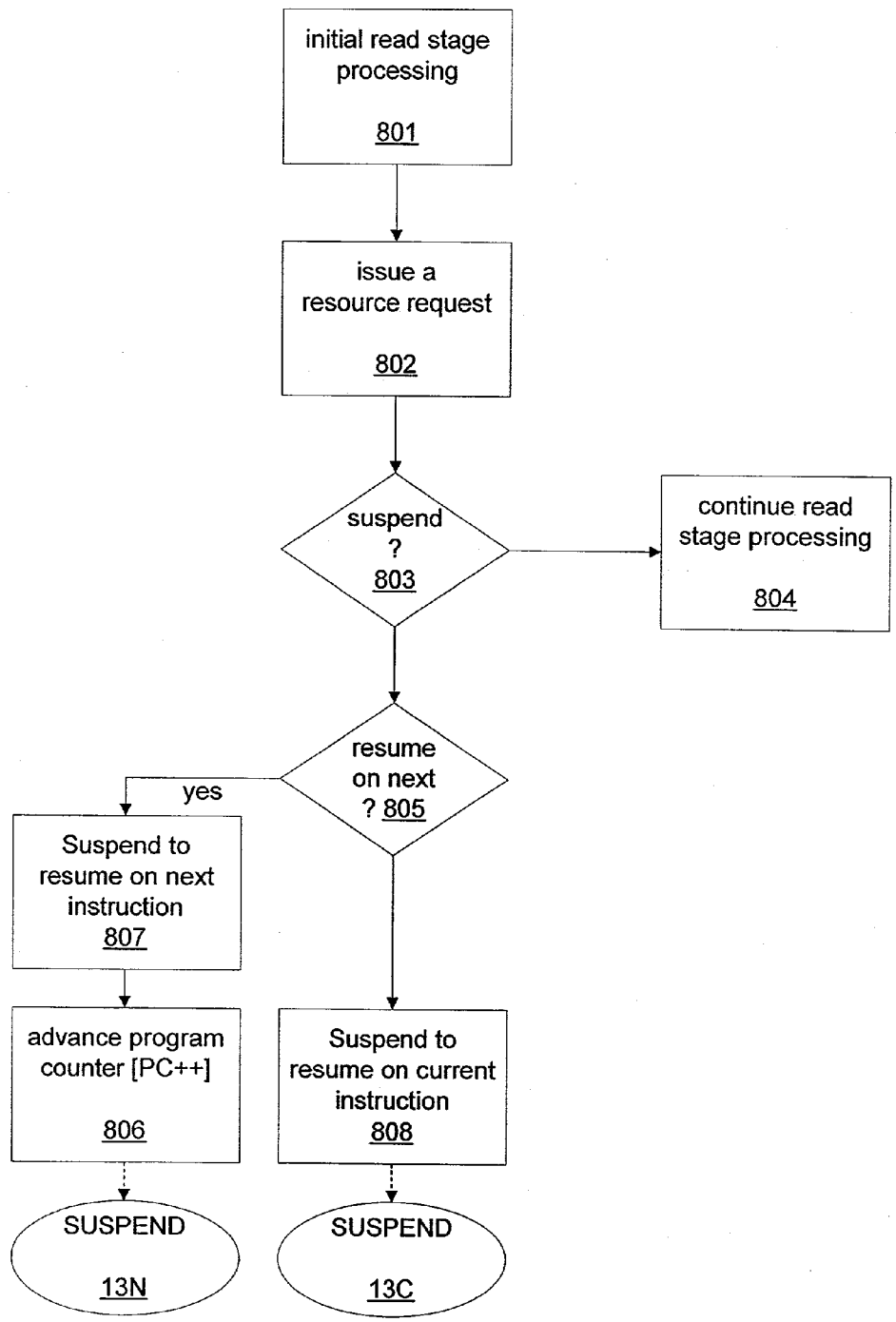
FIG. 8 illustrates a flow chart of the read stage.

FIG. 8 illustrates a flow chart of the read stage. Initial read stage processing 801 is performed. If a resource request is required, the task will issue a resource request 802. At step 803, suspend checking is performed. Depending on the results this checking, either step 804 is performed ("continue read stage processing"), or step 805 is performed. At step 805, resume-on-next checking is performed. Depending on the results of this step, either (a) step 808 is performed ("suspend to resume on current instruction") and the SUSPEND state 13C is entered, or (b) step 807 is performed ("suspend to resume on next instruction"), followed by step 806 ("advance program counter"), after which the SUSPEND state 13N is entered.

Figures 9A, 9B:
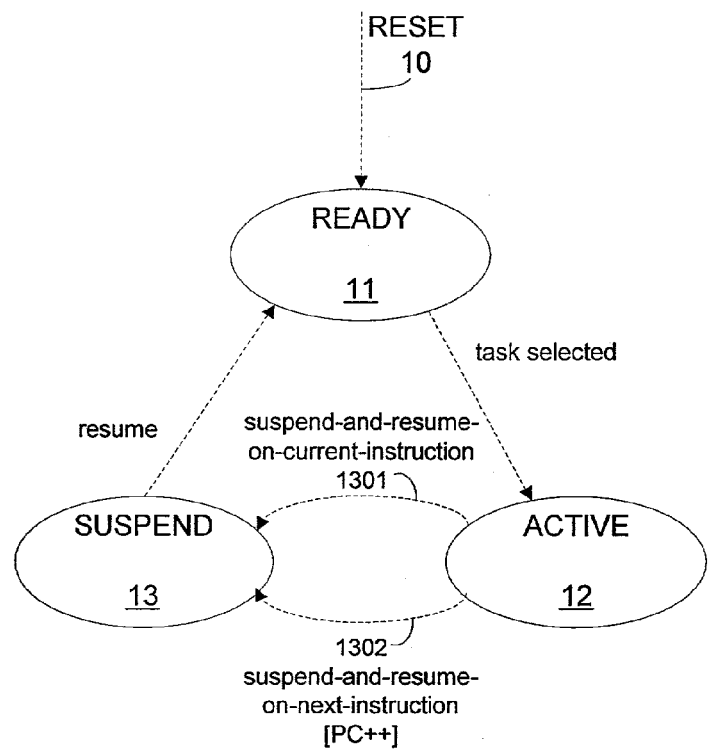
FIG. 9A illustrates a state transition diagram according to some embodiments of the present invention.
FIG. 9B illustrates an example of the states of multiple tasks, each with its own state.

FIG. 9A illustrates a state transition diagram according to some embodiments of the present invention. There is one independent task state machine for each task running on each microcontroller. On task RESET 10, the state machine is initialized to READY 11 state. A task in READY 11 state becomes active when the microcontroller determines that execution of program instructions should begin.

Some program instructions require services from one or more resources. If an instruction includes a suspend flag, then the task may enter the SUSPEND 13 state until the resource or requested results or data becomes available. Alternatively, if a resource is unavailable, the task may enter the SUSPEND 13 state until the resource becomes available. If the resource provides an indication that the task should suspend and resume on the current instruction, the program counter is left unchanged so that the same instruction will be re-executed when the task is next selected. If the resource provides an indication that the task should suspend and resume on the next instruction, the program counter is advanced so that the next instruction will be executed when the task is next selected.

Once the resource becomes available, the microcontroller changes the state from SUSPEND 13 to READY 11.

FIG. 9B illustrates an example of the states of multiple tasks, each with its own state. The table shows an example of a table maintained by microcontroller 400 running five tasks. After RESET 10, the current state of a task will be one of READY, ACTIVE or SUSPEND.

Figure 10A:
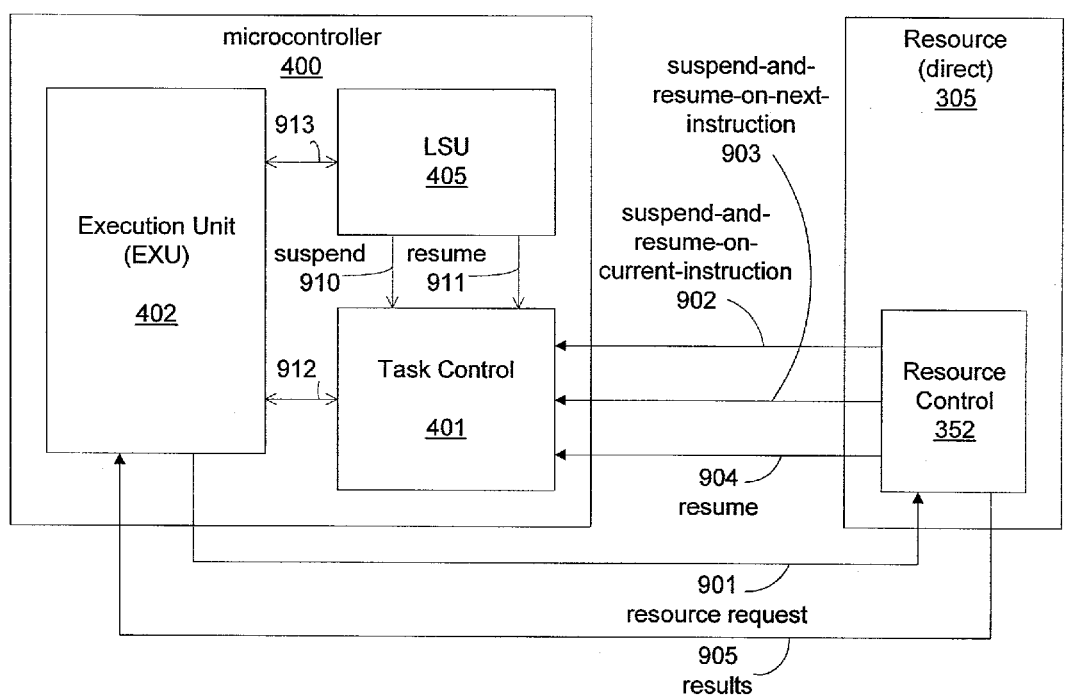
FIG. 10A illustrates a resource directly connected to a microcontroller in accordance with some embodiments of the present invention.

FIG. 10A illustrates a resource directly connected to a microcontroller in accordance with some embodiments of the present invention. A direct resource 350 is one that is directly connected to microcontroller 400 without going through a MAU. Execution unit 402 of microcontroller 400 sends resource request 901 to a resource control 352 of direct resource 305. Resource request includes a request and can also include a destination task, a destination register, a destination addressing mode and a destination data length if appropriate.

If resource request 901 requests that data be returned to a register in execution unit 402 of microcontroller 400, execution unit 402 indicates to LSU 405 to set a dirty-bit flag corresponding to the register or registers that resource 305 is being requested to fill.

If direct resource 305 is unable to presently honor resource request 901, control 352 asserts a suspend line. The suspend indication may be either a "suspend-and-resume-on-current-instruction" indication 902 or a "suspend-and-resume-on-next-instruction" indication 903.

Some direct resources 305 may capable of providing either indication 902 or 903, other direct resources 305 may be capable of providing just indication 902, and other direct resources 305 may be capable of providing just indication 903.

When direct resource 305 asserts suspend indication 902 or 903, it also de-asserts a resume indication 904 to indicate that direct resource 305 is not ready to grant resource request 901. Alternatively, resume 904 can be indicated by a lack of asserted suspend indications 902 and 903. If direct resource 305 asserts "suspend-and-resume-on-current-instruction" indication 903, then the PC is left unchanged and the task is set to the SUSPEND state. If direct resource 305 asserts "suspend-and-resume-on-next-instruction indication 904, then the PC is advanced to the next instruction and the task is set to the SUSPEND state.

Direct resource 305 might delay several instruction clock cycles before becoming ready to service resource request 901. When direct resource 305 is prepared to grant resource request 901, direct resource 305 asserts resume 904 and provides results 905, if any, to task control 401 of microcontroller 400. Results 905 can include the destination task, the destination register, the destination addressing mode and the destination data length. If new data is destined for a register in execution unit 402, task control 401 forwards the data to execution unit 402 via interconnect 912. If data is stored to a register, task control 401 indicates to LSU 405 to clear the associated dirty-bit.

Figure 10B:
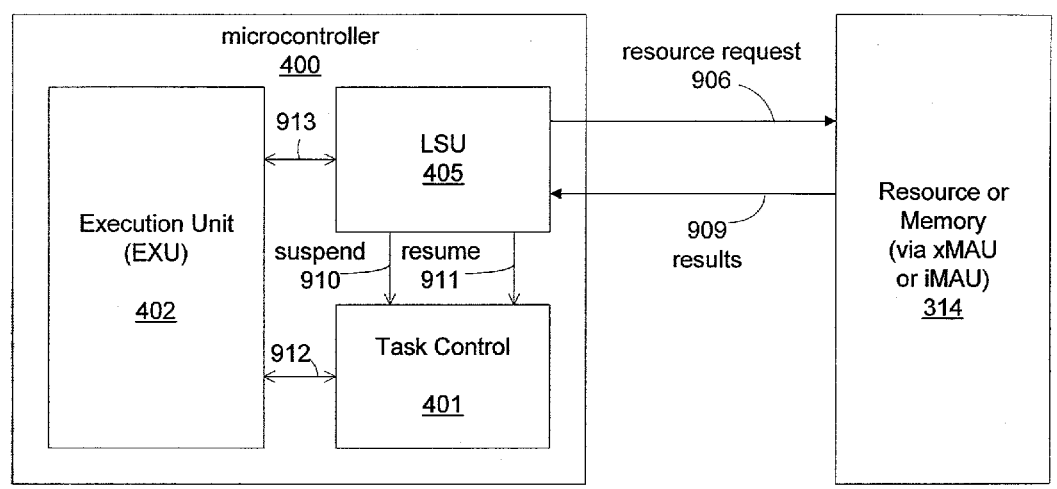
FIG. 10B illustrates a memory mapped resource or a memory mapped memory device in accordance with some embodiments of the present invention.

FIG. 10B illustrates a memory mapped resource or a memory mapped memory device in accordance with some embodiments of the present invention. Resource 314 is a resource or memory that is memory mapped and addressable by microcontroller 400 via a MAU. Execution unit 402 of microcontroller 400 sends resource request to LSU 405 via interconnect bus 913. LSU 405 forwards a resource request 906 to resource 314.

If resource request 906 requests that data be returned to a register in execution unit 402 of microcontroller 400, execution unit 402 indicates to LSU 405 to set a dirty-bit flag corresponding to the register or registers that resource 314 is being requested to fill.

Resource request 906 includes a request and can also include a destination task, a destination register, a destination addressing mode and a destination data length if appropriate.

If execution unit 402 is executing a load instruction with a suspend flag set, execution unit 402 sends task control 401 across interconnect 912 a suspend indication allowing for the PC to be advanced to the next instruction on completion of the current instruction. The suspend indication across interconnect 912 can be either a "suspend-and-resume-on-current-instruction" indication or a "suspend-and-resume-on-next-instruction" indication. Execution unit 402 can advance the PC. Alternatively, task control 401 can advance the PC.

In some embodiments, execution unit 402 is capable of providing either a "suspend-and-resume-on-current-instruction" indication or a "suspend-and-resume-on-next-instruction" indication. In other embodiments, execution unit 402 is capable of providing just a "suspend-and-resume-on-current-instruction" indication, while in other embodiments execution unit 402 is capable of providing just a "suspend-and-resume-on-next-instruction" indication.

If resource 314 asserts "suspend-and-resume-on-current-instruction" indication, then the PC is left unchanged and the task is set to the SUSPEND state. If resource 314 asserts "suspend-and-resume-on-next-instruction" indication then the PC is advanced to the next instruction and the task is set to the SUSPEND state.

Resource 314 might delay several instruction clock cycles before becoming ready to service resource request 906. When resource 314 is prepared to grant resource request 906, resource 314 provides results 909 to LSU 405 which provides results 909 to execution unit 402 which in turn stores results in the designated destination register or registers. LSU 405 also clear the corresponding dirty bit indicating that the value in the destination register is valid. LSU 405 also provides resume indication 911 to task control 401. Task control 401 changes task state from SUSPEND to READY.

Results 909 can include the destination task, destination register, destination addressing mode and destination data length.

Figure 10C:
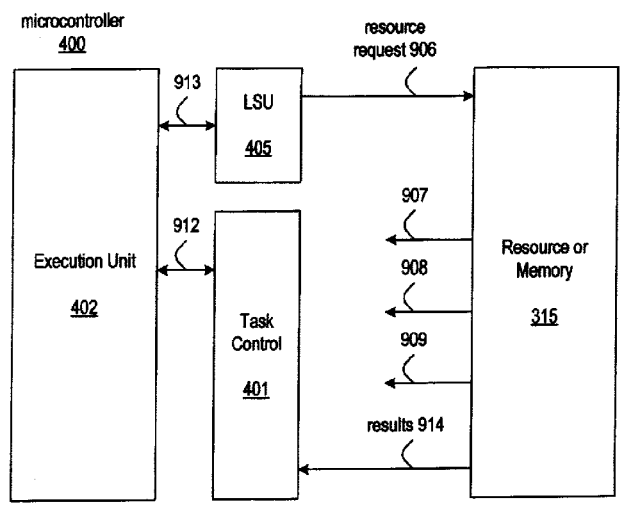
FIG. 10C illustrates another memory mapped resource or a memory mapped memory device in accordance with some embodiments of the present invention.

FIG. 10C illustrates another memory mapped resource or a memory mapped memory device in accordance with some embodiments of the present invention. Resource 315 is a resource or memory that is memory mapped and addressable by microcontroller 400 via a MAU. Execution unit 402 of microcontroller 400 sends resource request to LSU 405 via interconnect bus 913. LSU 405 forwards a resource request 906 to resource 315.

Resource request includes a request and can also include a destination task, a destination register, a destination addressing mode and a destination data length if appropriate.

If resource request 906 requests that data be returned to a register in execution unit 402 of microcontroller 400, execution unit 402 indicates to LSU 405 to set a dirty-bit flag corresponding to the register or registers that resource 315 is being requested to fill.

If execution unit 402 is executing a load instruction with a suspend flag set, execution unit 402 sends task control 401 across interconnect 912 a suspend indication allowing for the PC to be advanced to the next instruction on completion of the current instruction. The suspend indication across interconnect 912 can be either a "suspend-and-resume-on-current-instruction" indication or a "suspend-and-resume-on-next-instruction" indication. Execution unit 402 can advance the PC. Alternatively, task control 401 can advance the PC.

If resource 315 is unable to presently honor resource request 906, resource 315 asserts a suspend line. The suspend indication may be either a "suspend-and-resume-on-current-instruction" indication 907 or a "suspend-and-resume-on-next-instruction" indication 908.

Some resources 315 may be capable of providing either indication 907 or 908, other resources 315 may be capable of providing just indication 907, and other direct resources 315 may be capable of providing just indication 908.

When resource 315 asserts suspend indication 907 or 908, it also de-asserts a resume indication 909 to indicate that resource 315 is not ready to grant resource request 906. Alternatively, resume 909 can be indicated by a lack of asserted suspend indications 907 and 908. If resource 315 asserts "suspend-and-resume-on-current-instruction 907," then the PC is left unchanged and the task is set to the SUSPEND state. If resource 315 asserts "suspend-and-resume-on-next-instruction 908," then the PC is advanced to the next instruction and the task is set to the SUSPEND state.

Resource 315 might delay several instruction clock cycles before becoming ready to service resource request 906. When resource 315 is prepared to grant resource request 906, resource 315 asserts resume 909 and provides results 914, if any, to task control 401 of microcontroller 400. Results 914 can include the destination task, the destination register, the destination addressing mode and the destination data length. If new data is destined for a register in execution unit 402, LSU 405 forwards the data to execution unit 402 via interconnect 913. If data is stored to a register, LSU 405 clears the register's associated dirty-bit to indicate the data is available.

Figure 11:
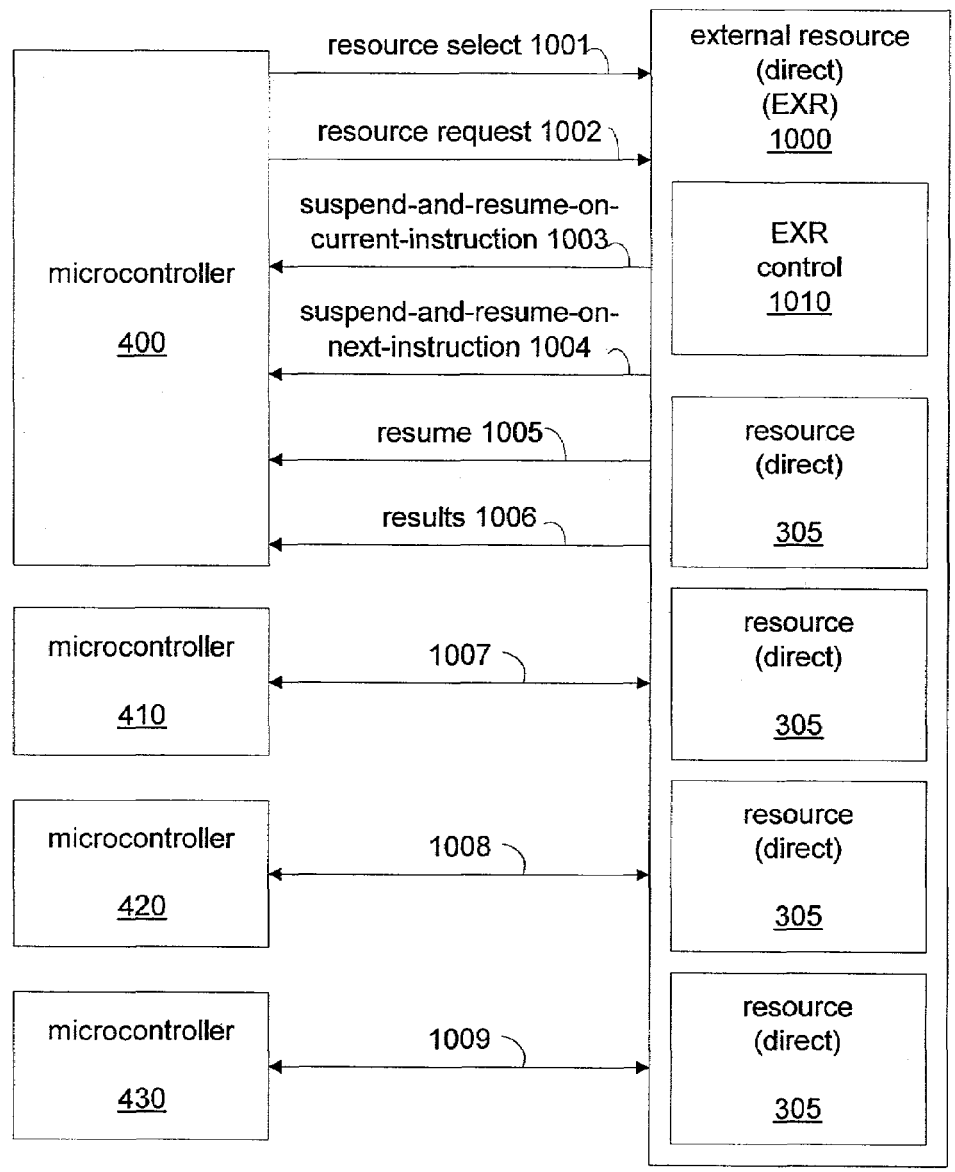
FIG. 11 illustrates an external resource unit connected directly to multiple microcontrollers in accordance with some embodiments of the present invention.

FIG. 11 illustrates an external resource unit connected directly to multiple microcontrollers in accordance with some embodiments of the present invention. Multiple microcontrollers 400, 410, 420 and 430 can select and use an individual direct resource 305 within EXR 1000. Direct external resources (EXR) 1000 contains EXR control 1010 and multiple direct resources 305. Each microcontroller 400 has direct connections to EXR 1000.

Between each microcontroller 400 and EXR 1000 are multiple signals. A resource select 1001 indicates to EXR control 1010 that microcontroller 400 wishes to select a particular resource. Resource select 1001 includes a direct resource identification. Resource request 1002 indicates the type of resource requested, (e.g., set semaphore, start DMA or read data). A "suspend-and-resume-on-current-instruction" indication 1003 from direct resource 305 informs the task in microcontroller 400 to suspend without advancing the PC. A "suspend-and-resume-on-next-instruction" indication 1004 from direct resource 305 informs the task in microcontroller 400 to suspend after advancing the PC. Resume indication 1004 from direct resource 305 indicates that the event or situation that caused an earlier suspend has terminated, thus the task should be moved from the SUSPEND state to the READY state. Results 1006 provide the requested data if any were requested.

In accordance with some embodiments of the present invention, three indications (i.e., the two suspend indicators and the resume indicator) are encoded into two lines ($n_1$ and $n_2$). For example, $[n_1n_2]$: {00} indicates the resource is granted; {01} indicates "suspend-and-resume-on-next-instruction"; {10} indicates "suspend-and-resume-on-current-instruction"; and {11} indicates resume.

Resources also include a resource to control one or more semaphores. If a semaphore resource is not available to a resource request such as a set semaphore command, the request can enter a FIFO on the resource. The resource will return a "suspend-and-resume-on-next-instruction" indication to the requesting task. If the FIFO is full or non-existent, the semaphore resource can return a "suspend-and-resume-on-current-instruction" indication to the requesting task.

Resources also include DMAs. A channel processor can contain an output data FIFO holding data that the channel processor is accumulating and an input command FIFO holding commands from the microcontroller. A microcontroller can issue a resource request to the channel processor. The resource request can be stored in the input command FIFO. A resource request can include a command to invoke a DMA transfer from the output data FIFO to the microcontroller. If the data FIFO is not ready, the channel processor can return a "suspend-and-resume-on-next-instruction" indication to the requesting task. If the channel processor does not have an input command FIFO, the channel processor resource can return a "suspend-and-resume-on-current-instruction" indication to the requesting task.

The above detailed descriptions are provided to illustrate specific embodiments of the present invention and are not intended to be limiting. Numerous modifications and variations within the scope of the present invention are possible. The present invention is defined by the appended claims.

We claim:

1. A computer readable storage comprising computer instructions readable and executable by a computer processor in execution of an instruction flow, said computer instructions comprising a first computer instruction comprising a suspend field for specifying to the processor that said flow is to be suspended and is to be later resumed by executing a next computer instruction immediately following the first computer instruction in said flow;

wherein the first computer instruction specifies a load operation for loading data to a storage location in the processor;

wherein the suspend field is for providing a first indication during the execution of the first computer instruction that said flow is to be suspended after generating a signal to initiate the load operation but before the load operation is completed, and that said flow is to be later resumed by executing a next computer instruction immediately following the first computer instruction in said flow; and wherein the computer processor is to suspend said flow in response to the first indication.

2. The computer readable storage of claim 1 wherein the first computer instruction comprises a field for specifying said storage location.

3. The computer readable storage of claim 2 wherein the storage location is accessed by said next computer instruction.

4. A computer processor comprising circuitry for executing computer instructions in a first flow of computer instructions, the computer instructions comprising a first computer instruction comprising a suspend field for specifying to the processor that the first flow is to be suspended and later resumed by executing a next computer instruction immediately following the first computer instruction in the first flow;

wherein the first computer instruction specifies a load operation for loading data to a storage location in the processor;

wherein the suspend field is operable to provide a first indication in the execution of the first computer instruction that the first flow is to be suspended after generating a signal to initiate the load operation but before the load operation is completed, and that the first flow is to be later resumed by executing a next computer instruction immediately following the first computer instruction in the first flow;

wherein the processor is operable to suspend the first flow in response to the first indication.

5. The computer processor of claim 4 wherein the first computer instruction comprises a field for specifying said storage location.

6. The computer processor of claim 5 wherein the storage location is in an execution unit of the processor, and said circuitry comprises circuitry for suspending the first flow if the suspend field specifies that the first flow is to be suspended, and for resuming the first flow only when the load operation has been completed.

7. The computer processor of claim 4 wherein said circuitry comprises an instruction execution pipeline operable to execute multiple instruction flows in a pipelined manner but the pipeline does not start executing an instruction of the first flow while executing an immediately preceding instruction of the first flow if the first flow is suspended while the immediately preceding instruction is in the pipeline.

8. A computer-implemented method for executing a first flow of computer instructions by an execution unit of a processor, the method comprising:

(a) executing a first computer instruction in the first flow, wherein execution of the first computer instruction comprises a load operation for loading data to a storage location in the execution unit;

(b) the execution of the first computer instruction providing a first indication that the first flow is to be suspended after generating a signal to initiate the load operation but before the load operation is completed, and that the first flow is to be later resumed by executing a next computer instruction immediately following the first computer instruction in the first flow; and (c) in response to the first indication, suspending the first flow.

9. The method of claim 8 further comprising:

(d) after the operation (b), receiving a resume indication that the first flow is to be resumed; and (e) resuming the first flow by executing said next computer instruction.

10. The method of claim 8 wherein in the operation (c) the first flow is suspended with the first flow's program counter pointing to said next computer instruction.

11. The method of claim 8 wherein said next computer instruction cannot be executed to completion until the load operation is completed.

12. The method of claim 8 wherein the first flow is resumed when the load operation is completed.

13. The method of claim 8 wherein the processor executes multiple instruction flows in a pipelined manner but does not start executing an instruction of the first flow while executing an immediately preceding instruction of the first flow.

14. The method of claim 8 further comprising resuming the first flow by executing said next computer instruction.

15. The method of claim 8 wherein the first computer instruction comprises a field for specifying said storage location.

16. The method of claim 8 wherein said processor comprises an instruction execution pipeline executing multiple instruction flows in a pipelined manner, and the pipeline does not start executing said next computer instruction while executing the first computer instruction.

17. A computer processor comprising an execution unit for executing a first flow of computer instructions, the first flow comprising a first computer instruction whose execution comprises a load operation for loading data to a storage location in the execution unit;

wherein the execution of the first computer instruction is operable to provide a first indication that the first flow is to be suspended after generating a signal to initiate the load operation but before the load operation is completed, and that the first flow is to be later resumed by executing a next computer instruction immediately following the first computer instruction in the first flow;

wherein the processor is operable to suspend the first flow in response to the first indication.

18. The computer processor of claim 17 wherein the processor is operable to resume the first flow in response to a resume indication, wherein the first flow is resumed by executing said next computer instruction by the execution unit.

19. The computer processor of claim 18 wherein the resume indication comprises an indication that the load operation has been completed.

20. The computer processor of claim 17 wherein the execution unit comprises an instruction execution pipeline operable to execute multiple instruction flows in a pipelined manner but the pipeline does not start executing an instruction of the first flow while executing an immediately preceding instruction of the first flow if the first flow is suspended while the immediately preceding instruction is in the pipeline.

\* \* \* \* \*